US011878664B2

(12) United States Patent
Stoel et al.

(10) Patent No.: US 11,878,664 B2
(45) Date of Patent: Jan. 23, 2024

(54) CARWASH SERVICE ENROLLMENT SYSTEM AND METHOD

(71) Applicant: VQ, Inc., Holland, MI (US)

(72) Inventors: Todd Stoel, Allegan, MI (US); Andrew VanWylen, Holland, MI (US); Hope Wadle, Walker, MI (US); Larry Pethick, Byron Center, MI (US); Mike Lemmen, Holland, MI (US); Juha Riikonen, Tampere (FI); Mikko Seppa, Masku (FI)

(73) Assignee: VQ, Inc., Holland, MI (US)

( * ) Notice: Subject to any disclaimer, the term of this patent is extended or adjusted under 35 U.S.C. 154(b) by 0 days.

(21) Appl. No.: 18/098,299

(22) Filed: Jan. 18, 2023

(65) Prior Publication Data

US 2023/0249653 A1    Aug. 10, 2023

Related U.S. Application Data

(60) Provisional application No. 63/307,851, filed on Feb. 8, 2022.

(51) Int. Cl.
*B60S 3/04* (2006.01)
*G06Q 50/10* (2012.01)

(52) U.S. Cl.
CPC ............... *B60S 3/04* (2013.01); *G06Q 50/10* (2013.01)

(58) Field of Classification Search
CPC .................................. B60S 3/00; G06Q 50/10
See application file for complete search history.

(56) References Cited

U.S. PATENT DOCUMENTS 9,405,988 B2    8/2016  Alves
10,994,705 B2   5/2021  Auer et al.
(Continued)

FOREIGN PATENT DOCUMENTS

CN        210822170       6/2020
DE   10 2006 017 999     10/2007
(Continued)

OTHER PUBLICATIONS

Washify "License Plate Recognition" as archived Mar. 7, 2021, available at: https://web.archive.org/web/20210307211111/https://washify.com/license-plate-recognition-for-car-washes/ (Year: 2021).*
(Continued)

*Primary Examiner* — Brendan S O'Shea
(74) *Attorney, Agent, or Firm* — Warner Norcross + Judd LLP

(57) ABSTRACT

A system and method for enrolling new carwash customer account profiles can or automatic access to carwash equipment. Baseline information is collected along with vehicle images for quick enrollment. The new customer can enter the carwash right away. As long as the account remains unclaimed the system periodically sends reminder messages. The unclaimed account can still wash, and the registration can be completed on the customer personal device while the vehicle is being washed or another convenient time. This provides a quick and easy way to register a new customer for a carwash subscription service or pay per wash product with automatic capture of much of the customer information—reducing the number of steps for the customer and team member operating the point-of-sale device. There is no need for manual entry of credit card information or vehicle information, enhancing enrollment efficiency for the customer.

24 Claims, 11 Drawing Sheets

(56) References Cited

U.S. PATENT DOCUMENTS

| | | | |
|---|---|---|---|
| 2009/0057401 A1* | 3/2009 | Brott | G06Q 20/28 |
| | | | 235/382 |
| 2015/0049914 A1* | 2/2015 | Alves | G06V 20/63 |
| | | | 382/105 |
| 2020/0226584 A1 | 7/2020 | Nawoj | |
| 2020/0334977 A1 | 10/2020 | Tang et al. | |
| 2022/0046012 A1* | 2/2022 | Neagle | G06F 18/22 |
| 2022/0086140 A1* | 3/2022 | Lo | H04L 63/18 |
| 2022/0092996 A1* | 3/2022 | Korngold | G06T 7/73 |
| 2022/0114598 A1* | 4/2022 | Perkna | G06Q 30/01 |

FOREIGN PATENT DOCUMENTS

| | | |
|---|---|---|
| JP | 2001-273461 | 10/2001 |
| KR | 2019-0124564 | 11/2019 |

OTHER PUBLICATIONS

Avutec "IoT ANPR Camera Systems for the Car Wash Industry" as archived Sep. 24, 2020, available at: https://web.archive.org/web/20200924182434/https://avutec.com/automated-car-washing-anpr/ (Year: 2020).*

International Search Report and the Written Opinion of the International Searching Authority for International Application No. PCT/US2023/011101 dated May 3, 2023.

* cited by examiner

| ID | PRODUCT | VEHICLE | TYPE | STATE | |
|---|---|---|---|---|---|
| 71650 | WORKS | BEQ2182 | SUBSCRIPTION | PREPAID (VALID UNTIL AUG 14, 2021 4:21 PM) | AUTOMATIC START CREATED |
| | | | | TRUE | JUL 14, 2021, 4:21:17 PM |

SHOWING 1 - 1 OF 1

*Fig. 4*

CUSTOMER DETAILS

UNCLAIMED    [CLAIM CUSTOMER] [EDIT] [SET DELINQUENT]

ID: 2370
TYPE: PRIVATE PERSON
PRIMARY SITE: TOMMY CAR WASH SYSTEMS
CREATED: JUNE 24, 2021, 11:40:11 AM (NAME@TOMMYCARWASH.COM)
LAST MODIFIED: JUNE 24, 2021, 11:40:11 AM (NAME@TOMMYCARWASH.COM)
FLEET CUSTOMER: FALSE

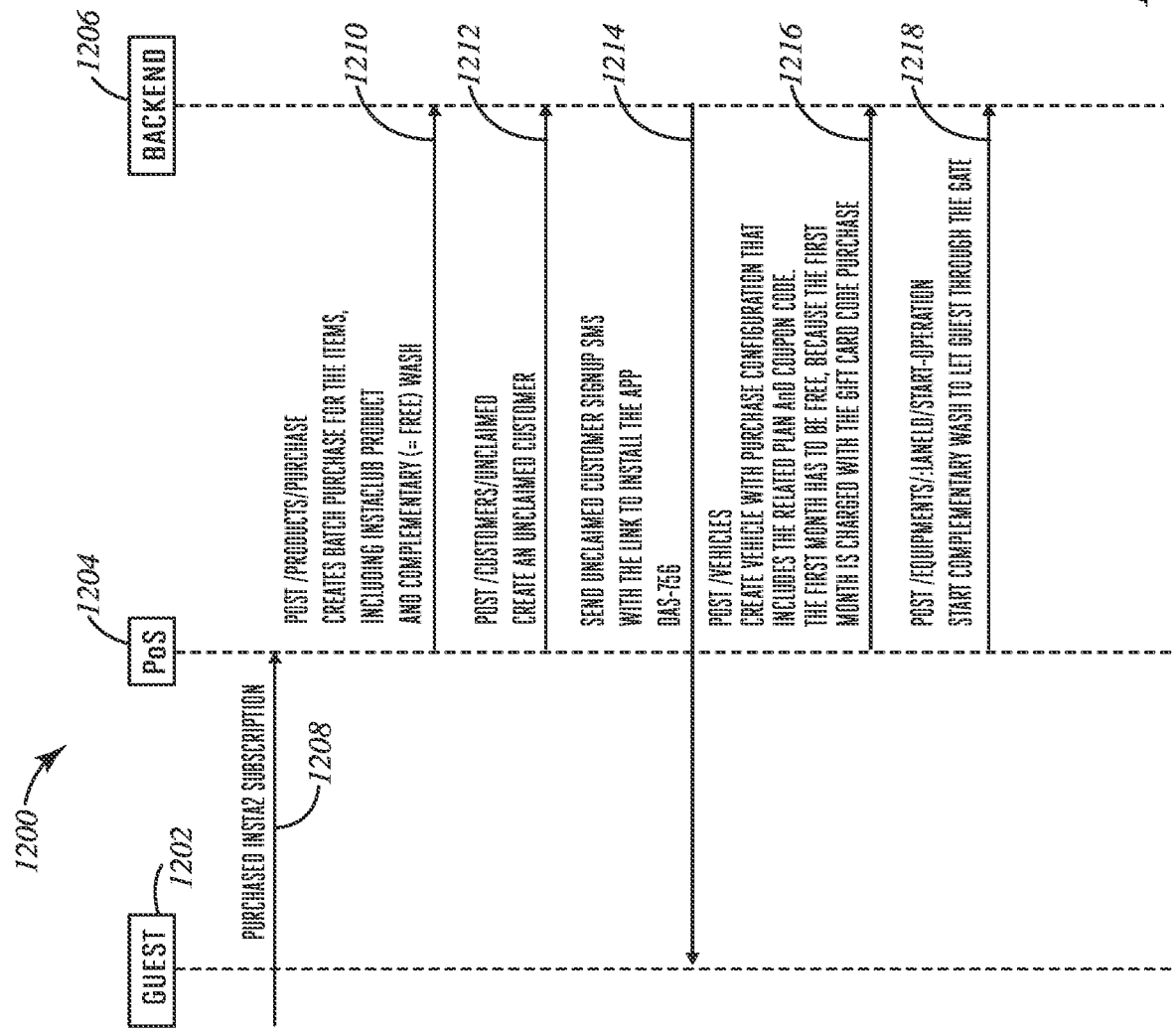

CARWASH SERVICE ENROLLMENT SYSTEM AND METHOD

BACKGROUND OF THE INVENTION

The present invention relates to carwash service products and enrollment systems for the like.

Car wash technology has changed drastically over the years. There have been numerous advancements to carwash equipment systems that move, soap, scrub, rinse, and dry vehicles. Some of these include automated conveyor-style systems to move cars efficiently and safely through the car wash to overhead sprinkler systems and air blowing systems to dry the car. These advances in carwash technology have greatly improved the car wash experience for customers, providing not only a better car wash over manual and semi-automated car wash systems and processes of yesteryear, but also often doing so in a fraction of the time of those systems.

While the carwash experience itself has advanced greatly due to automation, the process of accessing the carwash has generally remained a manual affair. The process of selecting options and paying for the car wash can be a deter customers from getting their car wash. While some systems have involved some degree of automation, there is ample room for improvement in the carwash enrollment systems and processes.

SUMMARY OF THE INVENTION

The present disclosure provides systems and methods for quickly and efficiently registering new carwash customer account profiles that provide automatic access to carwash equipment at carwash locations. A vehicle drives through a designated cashier lane where a carwash team member can greet the customer and collect information from the customer including a carwash service product selection, phone number, name, and payment information. In the background, the carwash system backend creates a carwash account profile with the associated information provided by the customer, the credit card reader charges, and saves the credit card information to the customer account, the license plate recognition setup (including one or more LPR cameras) on site captures an image of the vehicle license plate, recognizes various vehicle information, and associates that information with the customer account.

The carwash system is configured to permit authorized customer accounts automatic access to the car wash equipment utilizing a carwash lane at a carwash location. At some carwash locations, a specific lane may be designated for providing automatic access to car wash equipment, sometimes referred to as an app lane. That is, in response to the vehicle coming within view of the camera setup in the app lane, the camera setup captures an image of the vehicle license plate and determines whether the vehicle is associated with a registered carwash service account that is authorized to wash and if so, automatically permits access to the carwash equipment.

The system and method for enrolling the customer in the carwash service quickly establishes the baseline information to create an unclaimed customer account. This keeps the registration experience quick and efficient allowing the new customer to enter the carwash right away without the possibility of being charged a recurring fee for the subscription. The unclaimed account status causes the system to send an SMS message to the customer prompting them to download the companion carwash app and agree to the terms and conditions for the recurring charges. Because the customer has already created an unclaimed account and is permitted to wash, this process can be completed on their personal mobile device while the customer's vehicle is being washed. This provides a quick and easy way to register a new customer for a carwash subscription service or pay per wash product with automatic capture of much of the customer information—reducing the number of steps for the customer. In particular, the customer does not need to manually input credit card information or vehicle information, which can be two pain points that often prevent registration of carwash service accounts.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIG. 4 illustrates an exemplary a partial carwash service account dashboard view of the point of service device interface.

FIG. 5 illustrates an exemplary customer details section of a customer account.

FIG. 6 depicts an exemplary payments tab for an exemplary customer account in the dashboard interface.

FIG. 7 illustrates an archive dialog box.

FIG. 12 depicts an exemplary diagram of carwash service signup flow.

DESCRIPTION OF THE CURRENT EMBODIMENT

Figure 1:
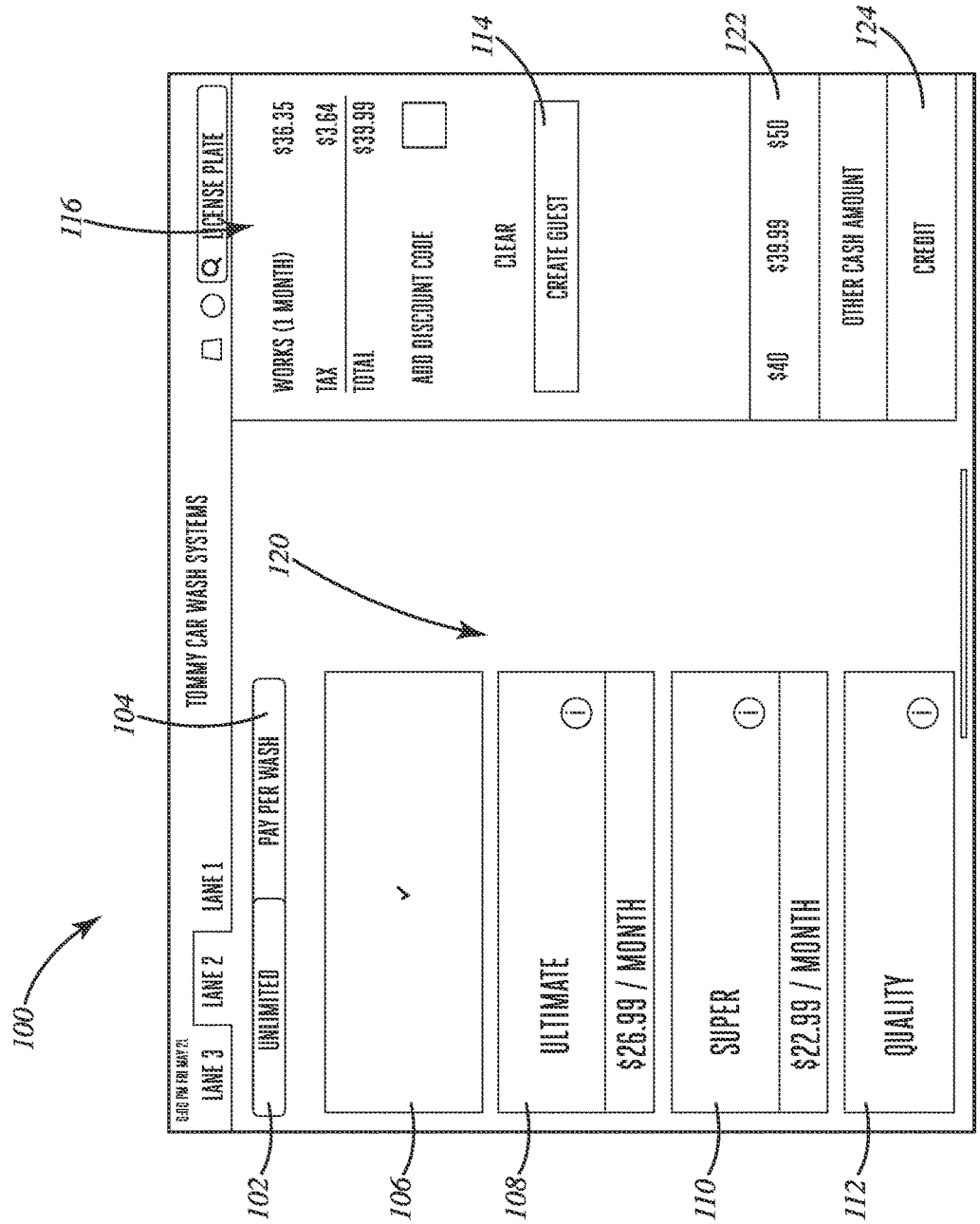
FIG. 1 depicts an exemplary carwash service point of service device interface.

The present disclosure is generally directed to a system and method for automatically registering a vehicle to a carwash service associated with a plurality of different carwash service locations. One aspect is directed to a system and method for automatically registering a vehicle to a carwash subscription service and another aspect is directed to a system and method for automatically registering a vehicle to a carwash pay per wash service.

Systems and methods for robustly and efficiently signing up new customers for a carwash service, e.g., a carwash subscription service or a pay per carwash service, are disclosed. The carwash service app design and user interface combined with the other systems and methods of the present disclosure reduces the amount of information a new customer is required to enter into the app after visiting the carwash point of sale (e.g., a drive-up carwash service window). By utilizing a robust merchant client along with car recognition software the systems and methods of the present disclosure can automate a large portion of the customer account registration process at the point of sale. The car recognition software can take a variety of different forms. In some embodiments, the car recognition software can recognize vehicle make and vehicle model. In other embodiments, the car recognition software can be configured to recognize vehicle year, vehicle model type, vehicle color, along with other identifiable vehicle characteristics.

By way of example, methods in accordance with the present disclosure can generally include the following steps: capturing, with a camera, an image of a vehicle license plate of the vehicle at one of the plurality of carwash service locations, processing, with a computer processor configured to process license plate images, the image of the vehicle license plate with license plate recognition software to determine a set of vehicle characteristics associated with the vehicle license plate including a license plate number associated with the vehicle license plate, a state of origin associated with the vehicle license plate, and a make and model associated with the vehicle license plate, and comparing, with a computer processor configured to compare vehicle characteristics, the set of vehicle characteristics associated with the vehicle license plate to vehicle characteristics of carwash service profiles registered in a carwash service database to determine whether the vehicle is registered for the carwash service associated with the plurality of different carwash service locations. In response to the vehicle not being associated with a carwash subscription service profile in the carwash subscription service database, the system is configured to generate a new carwash service profile in memory, associate a set of vehicle characteristics of the vehicle with the new carwash service profile in memory, receive user input indicative of customer identification for the new carwash service profile at a user interface of a point-of-sale computer located at the one of the plurality of carwash service locations, receive user input indicative of a selection of a carwash service configuration for the new carwash service profile at the user interface of the point-of-sale computer located at the one of the plurality of carwash service locations, receive user input indicative of initial carwash service payment information at the user interface of the point-of-sale computer at the one of the plurality of carwash service locations, associate the initial carwash service payment information with the new carwash service profile; and setting the new carwash service profile to an unclaimed status. Some embodiments of the system and method include transmitting an SMS message to a customer mobile device based on customer identification, the SMS message including a deep link to download a carwash service app. In response to the vehicle being associated with a carwash service profile in the carwash service database and the associated carwash service profile having the unclaimed status, the system and method can permit the vehicle to access car wash equipment at one or more of the plurality of carwash service locations during an initial time period based upon the associated carwash service configuration and the initial carwash service payment information. The system and method can also restrict the vehicle from accessing car was equipment at one or more of the plurality of carwash service locations after the initial time period. For subscription based embodiments, the system and method can be configured for unclaimed accounts to prevent submission of an automatic renewal payment for the carwash subscription service of the associated carwash subscription service profile based upon the initial carwash service payment information in the associated carwash subscription service profile and transmit an SMS reminder message to the customer mobile device based on the customer identification, the SMS reminder message reminding the customer the associated carwash subscription service profile has an unclaimed status. In response to the vehicle being associated with a carwash service profile in the carwash service database and the associated carwash service profile having the claimed status, the system can be configured to permit the vehicle to access car wash equipment at the one of the plurality of carwash service locations based upon the associated carwash subscription service configuration.

Figure 13:
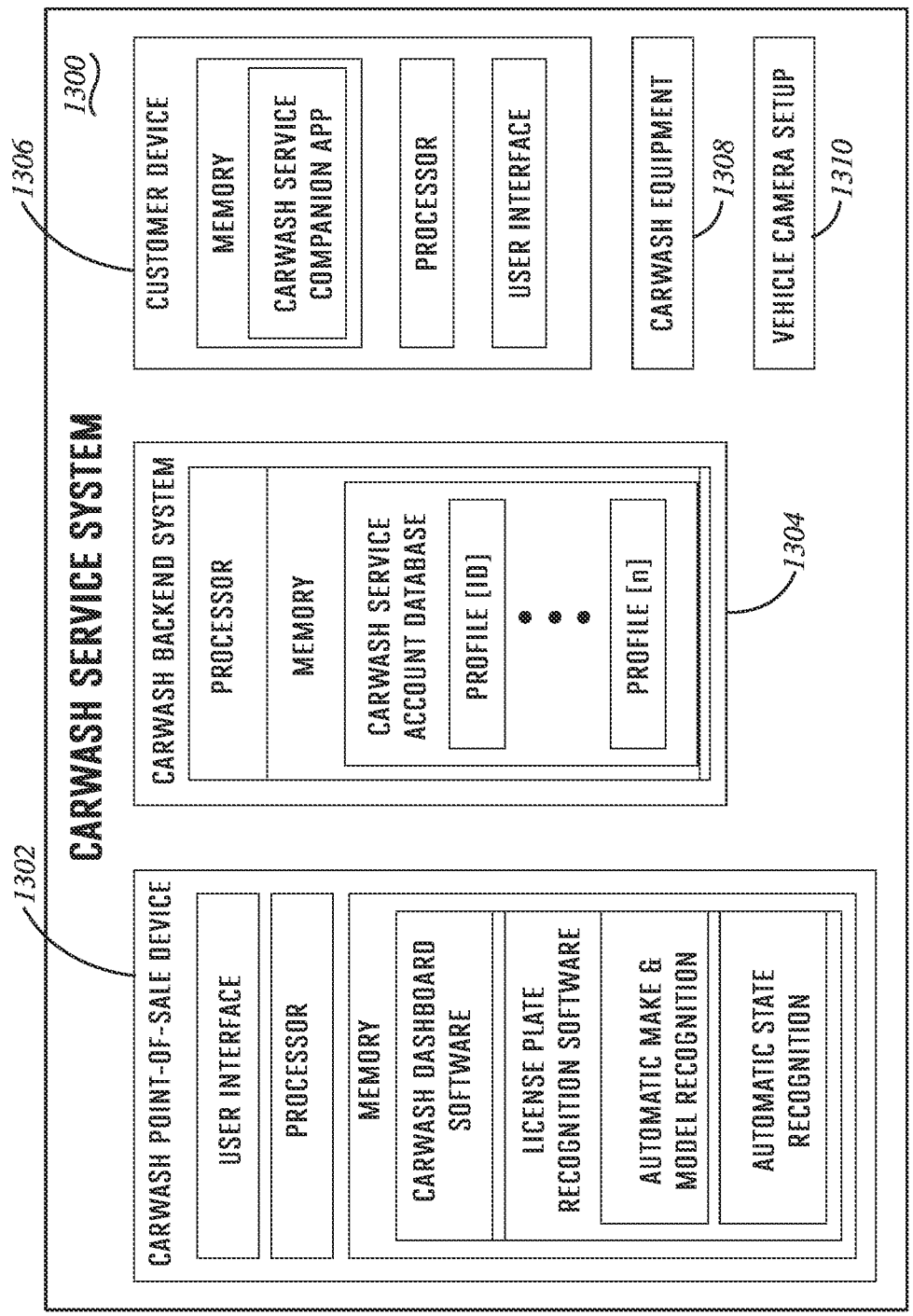
FIG. 13 depicts an exemplary carwash system block diagram.

Referring to FIG. 13 an exemplary carwash service system 1300 is depicted and will now be described. This exemplary embodiment of the system can include a carwash point-of-sale device 1302, a carwash backend system 1304, one or more customer devices 1306, carwash equipment 1308, and a vehicle camera setup 1310. The point of sale device 1302, carwash equipment 1308 and vehicle camera setup 1310 can be located at a carwash service location. In some embodiments there may be multiple instances of the point of sale devices, carwash equipment, and vehicle camera setups. For example, a large carwash location may have multiple cashier lanes, each with their own point of sale device and/or multiple sets of carwash equipment for washing multiple cars in parallel. Further, the carwash location may be setup with a plurality of lanes that provide orderly access to the carwash equipment 1308. Some of the lanes may be configured for fully automated access via the carwash service subscriptions and a vehicle camera setup that recognizes and authorizes vehicle entry into the carwash, sometimes referred to as an "APP" lane. Other lanes may be configured for manual authorization or for a hybrid approach.

The carwash backend system 1304 can be co-located at one carwash location or distributed across many carwash locations. Alternatively, the carwash backend system can be located off site at a remote server, such as on a cloud server platform. The carwash backend system can include a variety of different modules and features. The carwash backend system may include a processor configured for receiving and carrying out various instructions. The carwash backend system may also include memory that can store essentially any information associated with the carwash service system. Notably the memory can include a carwash service account database that can store various profiles. IN the current embodiment, each carwash service account profile includes an associated unique ID, which can be utilized to uniquely identify the profile. The profile can contain a variety of different pieces of information, as discussed in more detail below, such as customer information, payment information, vehicle information, and carwash service product information to name a few.

The carwash point-of-sale device can be located at the carwash location lane just before vehicles gain access to the carwash equipment. The carwash point-of-sale device can be configured for a carwash service team member to efficiently guide customers through the process of purchasing carwash service products. These can include one-time wash purchases, but also carwash service products such as a carwash subscription service or carwash pay-per-wash service. The point of sale device can be utilized to carry out the transaction to not only purchase the products but also to assist in initial setup of the appropriate carwash service account, to make future purchases automatic or semi-automatic. The point-of-sale-device can include a processor, memory, and a user interface. The processor can carry out the various functionality of the carwash dashboard software and license plate recognition software stored in memory that is discussed in detail below. In alternative embodiments, the license plate recognition software may be located in the carwash backend system or in a separate third party server located on site or elsewhere. The carwash point of sale device can include a credit card reader or be capable of communication with a credit card reader machine or other merchant processor device.

The customer device can be the customer's personal mobile device, such as a mobile phone or tablet. The customer device can be a general purpose computer that has a processor, memory, and a user interface. The customer device can be capable of having the carwash service companion app installed on it and communicating with the carwash point-of-sale device and/or carwash backend system. In other embodiments, the customer device can be capable of accessing and communicating with the carwash point-of-sale device and/or carwash backend system via a web browser, e.g., a carwash service companion web application. That is, the carwash service companion app can be a dedicated application installed on a customer device or a web application accessible via a browser.

Definitions are provided herein for a few carwash service terms are utilized throughout this disclosure:

Stripe Terminal—Merchant computer processor for Point of Sale. Some exemplary processors include the Verifone P400 credit card reader, BBPoS WisePoS E, BBPoS Chipper 2×BT or Stripe Reader M2;

Unclaimed Customer Account—An unclaimed customer account is an account registered for the carwash subscription service where the customer has not completed the account claiming process, such as agreeing to the Privacy Policy and Terms & Conditions in the app. The carwash subscription system is configured to allow this type of customer account access to the various car wash locations during an initial time period (e.g., the first billing period/first month) as if they are a regular member. After the initial time period, the system is configured to automatically restrict the unclaimed customer account access to the carwash until the account registration process is complete and the account is claimed.

Claimed Customer Account—A claimed customer account refers to an account where the customer has agreed to the Terms & Conditions in the app and has become a recurring member.

Deep Link—A type of link that sends customers directly into a predetermined section of the app. It can also determine if the app is downloaded on the user's phone, if not, it can direct the user to the appropriate app store to download the app. Then, upon activation of the deep link the app opens and automatically directs to a predetermined configuration or location in the app.

AMMR—Automatic Make & Model Recognition refers to a recognition system or process that identifies a vehicles make and model utilizing image recognition.

ASR—Automatic State Recognition. A recognition process that identifies a license plate state of origin utilizing image recognition.

An example of a carwash service system and process in accordance with the present disclosure will now be described in detail. As vehicles drive up to a cashier lane at one of a plurality of carwash locations, they can register a new carwash service account, purchase a carwash service product, or be automatically permitted to wash their vehicle depending on their carwash service account status.

Upon arriving to a lane within view of a camera setup, one or more cameras capture one or more images of the vehicle. The cameras can provide images to a computer on site running Automatic License Plate Recognition (ALPR), Automatic State Recognition (ASR), and/or Automatic Make and Model Recognition (AMMR) software. Alternatively, the one or more images can be communicated over a network to an offsite computer running ALPR, ASR, and/or AMMR software. Although the current embodiment includes license plate recognition features (e.g., make, model, and state), in alternative embodiments additional automatic vehicle recognition software can be utilized. For example, in some embodiments additional or different identifiable features about a vehicle can be automatically recognized by analysis of the images produced by the camera setup, such as vehicle color.

A license plate recognition program can take all three recognition programs: (ALPR, ASR, AMMR) to make a determination of what vehicle is in view of the camera. Once the program makes a determination or has a certain level of confidence that the vehicle in the camera view is accurate it can be configured to send the recognition details to a carwash service backend system, for example located in the cloud, to determine if the vehicle is an existing vehicle in the database or a new vehicle.

If the backend determines the vehicle recognition sent from the site is an existing vehicle in the database, the vehicle can be permitted access to the carwash equipment based on the carwash service product(s) associated with their account and/or their account details can be automatically pulled up on the point of sale computer so that a carwash point of sale service worker can easily assist them with purchasing a new carwash service product if their carwash service subscription has expired or they are a pay per wash customer.

To assist with creating a new guest account for a carwash subscription service, a specific carwash service subscription product can be selected on a point of sale device based on the guest's preference, then the point of sale service assistance can select the 'Create Guest' button on the point of sale device.

If vehicle within view of the camera setup does not match a vehicle in the carwash service database, upon entering the create customer form, the vehicle license plate number, state of origin of license plate, vehicle make, model and year can be auto-populated in the form for the person running the point of sale device by the automatic license plate recognition software.

The point of sale assistant can enter the vehicle color and inquire about the guest's first name, last name, and cell phone number for entry into the guest information of the new account profile. Upon saving the vehicle information and customer information data in association with the new carwash service account, the point of sale assistant can also inquire about the guest's payment information and select a suitable payment option. For example, the guest may pay cash or use a credit card to pay the first month of the carwash subscription service.

After payment is accepted and validated, the customer profile is created along with the vehicle information. Once created, the carwash customer account profile can be flagged as 'Unclaimed'. In general, unclaimed means that the guest has not yet interacted with the companion carwash service mobile phone application to verify the information associated with their account is correct and has not yet accepted the terms and conditions and privacy policy. During the customers first billing period they are a full member and can wash according to the subscription configuration they selected. Until the customer claims their account, the customer cannot be charged for any additional amount, and after the first billing period is over the customer will not be able to wash.

If a customer checks out at the point of sale with a credit card, that card can be associated to the customer's carwash service account in memory. Upon claiming the account, if they wish to use the same payment information, they will not have to reenter the credit card information manually because the payment information utilized to purchase the account is already associated with their account. However, if the customer checked out at the point of sale using cash or the like, then upon claiming the account they will need to enter in credit card or other payment information to pay for the recurring subscription fees.

Immediately or shortly after the carwash service product purchase, the carwash service system is configured to communicate a message welcoming the customer, and reminding them to download the app and complete the sign up process. This message can be communicated utilizing the short message service (SMS) protocol, rich communication services protocol, or essentially any other suitable message protocol. In the message is a deep link, once clicked if the app is not installed on their device it will bring the customer to the appropriate app store.

Later, for example after an initial period of time has passed such as a day from the purchase, the carwash service system can send additional messages to customer to remind them to complete their registration. The system can also send a reminder to the customer after each time they wash and their customer status is still unclaimed. Once the customer claims their account or texts 'Stop' to the number the carwash service system can be configured to stop sending email reminders.

If the customer in the lane is an existing customer and the 'Create Customer' button is selected, no data will auto populate in the fields. If the vehicle entered into the create customer form is already in the database and person using the PoS tries to create a new customer, the point of service device will not allow the creation of a new customer and instead can produce an error indicating as such.

If the phone number provided is already in the system the point of sale device can be configured not to allow the carwash service account to be created and will notify the person operating the device that the phone number already exists in the carwash service system database.

At any point after the initial purchase at the point of sale, the customer can claim their account and become a recurring member. If the customer uses the deep link sent in the message they will be brought to the appropriate app store to download the app. Upon first open after download the customer will be brought to the login screen. From there they will be sent an SMS message with a one-time access code to log in. After first log in the customer will be asked for any missing pieces of information, for example, email address and zip code. If customer paid cash at the initial point of sale purchase the app will prompt them to enter payment information, such as credit card information. After entering in any missing information the App can transition to a review screen for the customer to review their account information. This account information can include personal information, such as first and last name, phone number, email address, and zip code, vehicle information, such as make, model, license plate and state, and subscription plan, payment information, such as credit card information, marketing communication preferences, such as whether the customer would like to receive email and SMS messages, and the terms and conditions and privacy policy. Once information is confirmed and customer agrees to terms and conditions and privacy policy, the customer claims the account and the account status can be updated in the database. After claiming the account the customer can be presented with a video reminding the customer how the subscription works and how to wash at the car wash locations.

A customer can also download the app organically by manually searching the appropriate app store. Once downloaded and registration begins, if the phone number exists in the carwash service database, the account will be flagged and notice provided to the customer that there is already an account registered with that information. Once they agree to finish the account already set up for them they will be brought to as screen to fill in missing information. Since email was provided during organic sign up base information needed may only be Zip code. If customer paid cash at initial PoS purchase they will be asked to enter in a credit card. After entering in any missing information they will be brought to a review screen to review all of their information.

Customers can be registered with the carwash service directly at the point of sale using a point of sale device, such as a desktop computer, tablet computer, mobile computer, or another computing device. The point of sale device carwash service interface can include selectable options for registering new customer accounts. For example, FIG. 1 illustrates an exemplary carwash service interface 100 that can be displayed on the point of sale device. The current embodiment of the carwash service dashboard interface has two categories of carwash services: unlimited 102 and pay-per-wash 104 services. Customers can register their account as an unlimited monthly or pay-per-wash membership. For example, by tapping or otherwise activating the slider at the top of the appropriate dashboard tab, the carwash service product being selected changes between unlimited and pay-per-wash products.

Figure 2:
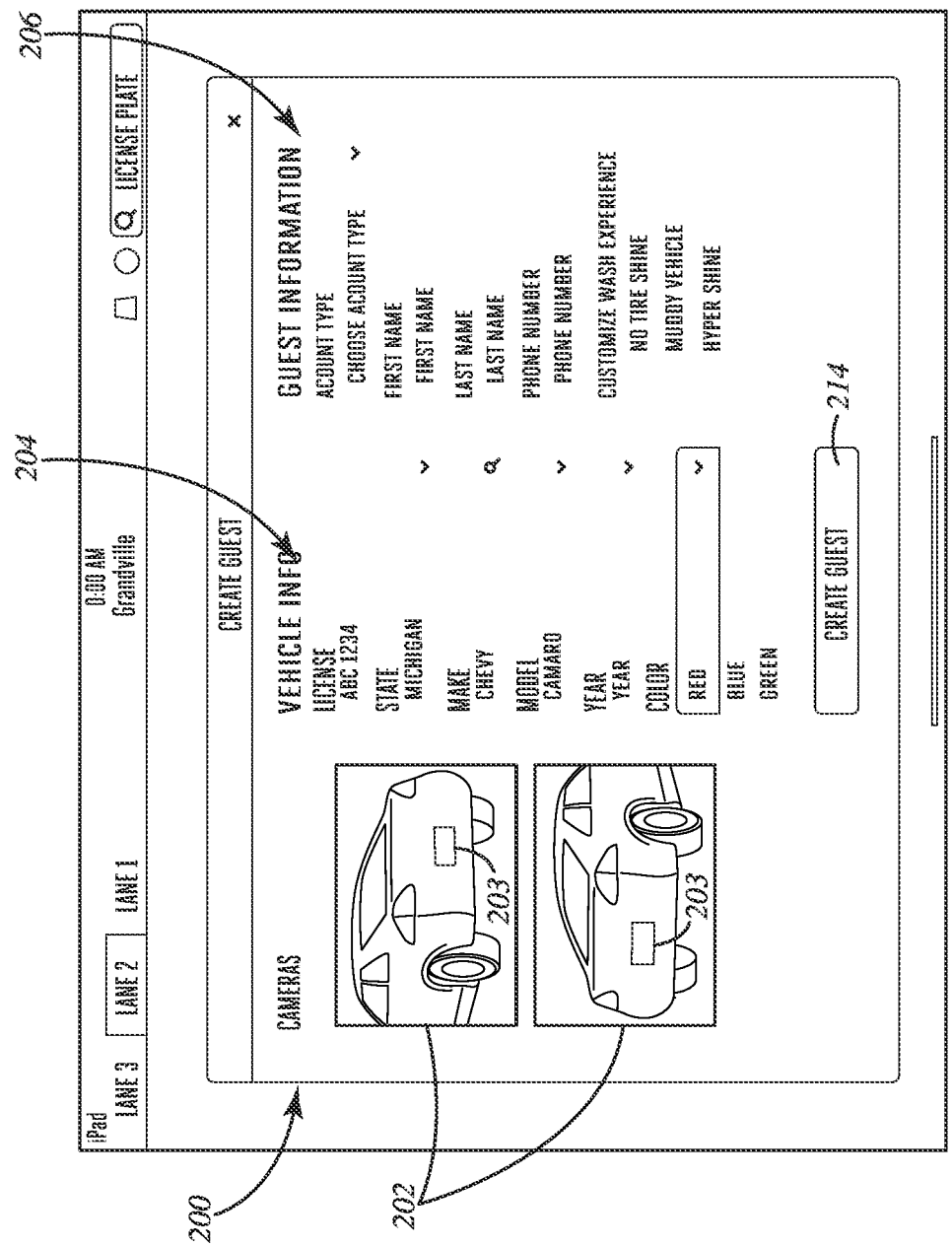
FIG. 2 depicts an exemplary carwash service account creation form.

Different types of carwash services can be provided as options at different price points that offer a different range of carwash services (e.g., works 106, ultimate 108, super 110, and quality 112 subscription carwash services and the pay per wash carwash service). In response to a carwash service being selected, the system can be configured to present a create customer account button (e.g., "Create Guest" button 114 in FIG. 1) in a transaction summary side bar 116. When activated (e.g., via a touch screen of the point of sale device or other user interface feature), an account creation form can be presented on the point of sale device. An exemplary account creation form 200 is depicted in FIG. 2. The point of sale device can be configured to accept account information input and verify the account information. For example, the processor of the point of sale device can be configured to verify (or communicate with another device via a network to verify) the vehicle information is unique and the phone number provided is not registered to another account in the system. Once the account information (e.g., including images of the vehicle 202 from one or more vehicle-pointed cameras, vehicle information 204, and customer information 206) is filled in and the create account button is tapped or otherwise activated, the account for the new customer can be created or queued up to be created by an account creation system.

In general, for carwash subscription service accounts, the system is configured such that carwash service subscription charges are not generated until the account has been claimed and a payment has been processed and accepted. If a stripe terminal reader or other merchant processor is used to capture a credit card payment information, the payment method can be attached to the new unclaimed customer account. When the customer claims their carwash subscription service account, credit card information need not be re-entered because it is already associated with their account from the initial transaction. If processed on another merchant or with cash, the carwash subscription service account may not have payment information pre-populated and instead the system can be configured to prompt the customer to enter their payment information (e.g., credit card information) into the app upon claiming the account.

Referring to the exemplary account creation form depicted in FIG. 2, an account creation form can be utilized to collect vehicle image information 202, vehicle information 204, and customer information 206. The form can include a variety of different fillable fields that can be entered via a user interface on the point of sale or other device or automatically filled based on communication from another device or system. For example, a carwash service team member at a carwash location can interact with a customer and enter information into the various fields. For example, information that can be entered into the account creation form can include license plate, stacked characters (if applicable), license plate state, vehicle make, vehicle model, vehicle year, vehicle color, account type, customer first name, customer last name, and customer phone number, to name a few examples. Some of the fields may be filled in automatically by sensor inputs of the carwash service system or another system in communication with the point of sale device. For example, the license plate, license plate state, vehicle make, and vehicle model fields can be filled automatically by Automatic Make & Model Recognition (AMMR) and Automatic State Recognition (ASR) systems that the carwash service system is configured to communicate with locally or via a network.

A carwash location may include multiple carwash lanes, each with an associated camera setup, which can include one or more cameras configured to capture images of a vehicle in an associated lane for use in customer account registration or customer account verification. The camera setup can be configured to pre-populate the appropriate image fields of the associated lane tab of the carwash service dashboard on the carwash service point of sale device. If one of the cameras fails to capture an image capable of suitable AMMR or ASR for one or more fields (e.g., license plate number, state, make, or model), then the information can be entered via a user interface of the point of sale device or another device, e.g., by tapping on the field and typing the appropriate information into the editable field. In some embodiments, some fields associated with the vehicle may be filled in via the user interface of the point of service device or another device, such as the vehicle year and vehicle color. The account type selection can be configured to default to personal. The other information, such as first name, last name, and phone number can be entered via the user interface of the point of service device or another device.

Figure 3:
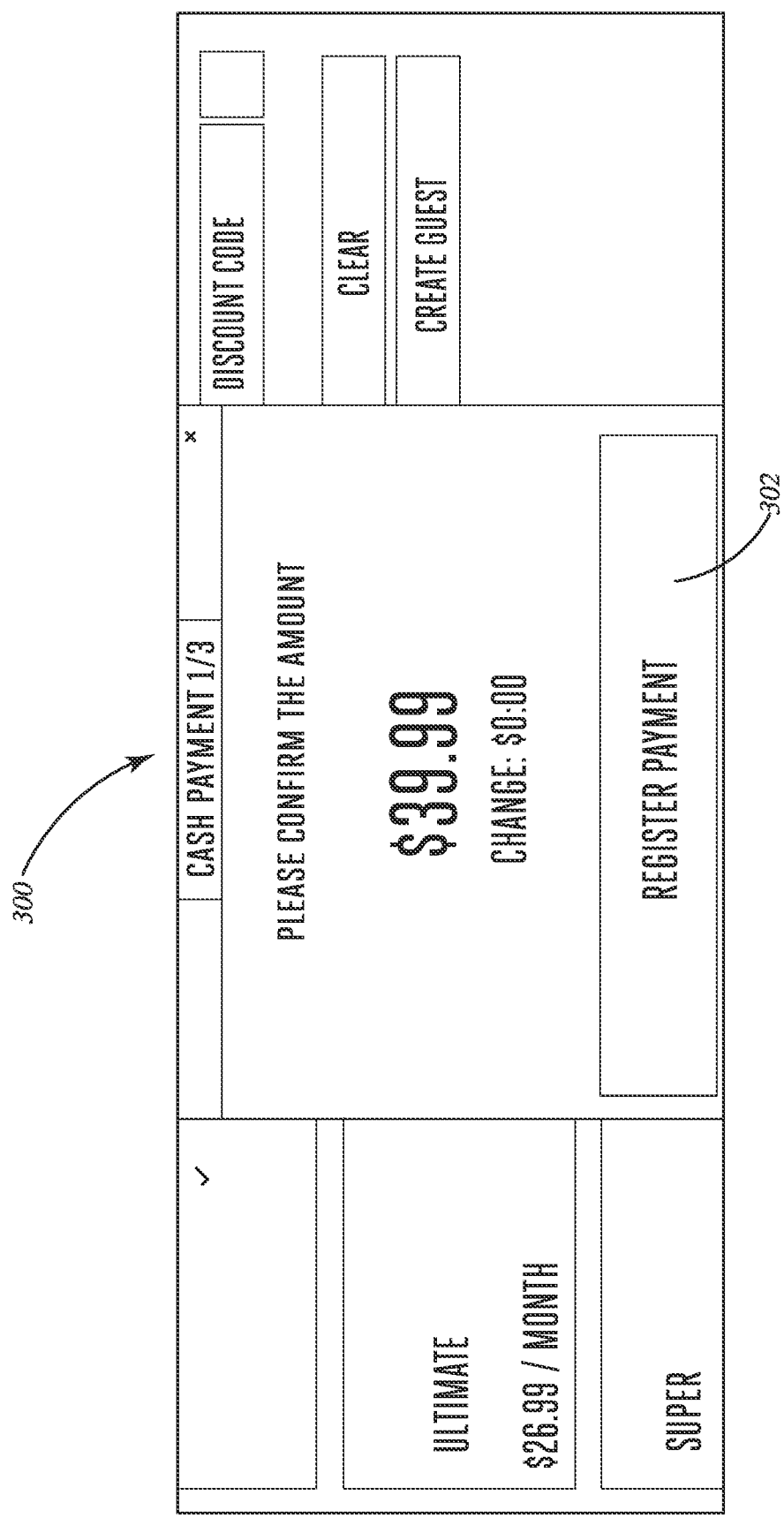
FIG. 3 illustrates an exemplary partial payment registration view of the point of service device interface.

One exemplary process for creation of an unclaimed customer account on a point of sale device in accordance with the current disclosure will now be described with reference to FIGS. 1-3. The exemplary process includes the following steps, which in this example are executed on a point of service device with a touch interface:

Tap the "Insta-Club" tab 120 on the left side of the screen.
Select the appropriate membership type: Unlimited 102 or Pay per Wash 104
Select the guests desired product 106-112
In the transactions area 116 on the right-hand side of the screen, tap the green 'Create Guest' button 114
License Plate, Stacked Characters, State, Make, Model fields are auto-filled if the vehicle in the lane is recognized. Edits can be made via the user interface if any field if incorrect or if the vehicle is not recognized.
Select vehicle year and color from a dropdown list.
Fill in the guest first and last name fields to be associated with the account.
Fill in the guest cell phone number to be associated with the account.
Tap green 'Create Guest' button 214 at the bottom of the form.
Back on the transaction screen 116, select the guest's preferred form of payment, e.g., cash 122 or credit 124.
Complete the purchase with the payment registration interface 300, an example of which is partially depicted in FIG. 3. The unclaimed customer account will be created in memory associated with the carwash system and the subscription status and other information can be displayed in the dashboard interface. Once the unclaimed customer account is created, the carwash is loaded to the lane controller and the vehicle is permitted access.

Details of the customer account can be edited. For example, the account can be recalled by searching the carwash account database and selecting a particular customer account. In the transaction area on the right-hand side of the interface, a menu option, e.g., a box, labeled "Guest Info" will appear. An "edit" link can be activated in the upper right-hand corner of the box. Desired changes to the customer information can be made and saved to the customer account from the edit page.

One advantage of the carwash service system of the present disclosure is that a customer's account can be created right away while at the carwash location and the customer's vehicle can be permitted to utilize the carwash immediately without having to utilize a carwash code printed on a receipt. If a carwash service is purchased without creating a new customer account, a carwash code can be printed on the receipt to allow carwash access.

The carwash point of service device can be associated with a cash drawer and be configured to open in response to register payment. That is, an associated cash drawer can be configured to open in response to a "Register Payment" button 302 or the like being tapped during the account registration process, e.g., as shown in FIG. 3. There may also be similar functionality for an account renewal or other payments. This configuration assists in ensuring payment is created before allowing a carwash service team member to interact with the cash drawer.

The carwash service system can includes a dashboard interface with a variety of different options.

One option is the creation of a customer account with a prepaid status. For example, the system can be configured such that newly created unclaimed customer accounts are created with a "prepaid" status in the dashboard. This status ensures that the if the customer does not claim their account, their carwash subscription service will end. In response to the customer claiming their account, the status associated with the customer account in memory can be updated from "prepaid" to a normal, active subscription or another type of carwash service. Put simply, once the carwash subscription service account is claimed, the carwash subscription service will automatically renew on their anniversary date or other appropriate renewal date.

An example of a prepaid status carwash subscription service customer account viewable on the dashboard 400 is shown in FIG. 4. In this example, the carwash service customer account 402 has a unique ID, a product type (Works), a vehicle license plate (DEQ2182), a service type (Subscription), a status and associated date (Prepaid), and an automatic start flag, and creation date. The automatic start flag is used to indicate the carwash service system should the vehicle to automatically enter the car wash.

The carwash service system can be configured such that unclaimed customer accounts are restricted from making additional purchases until the account is claimed. Configuring the system in this way helps to ensure future purchases are made on an approved credit card.

Unclaimed customer accounts that are pay-per-wash can be restricted from access to the carwash at the various associated carwash locations until their account is claimed. Unclaimed accounts that are the carwash subscription type can be permitted access to the carwash at the various associated carwash locations during the initial billing period. Once that billing period is complete, if the account remains unclaimed, the subscription can be configured to end and access to the carwash service can be automatically restricted at the various associated carwash locations. Further, the customer's account on the carwash service dashboard can be blocked from making purchases until the account is claimed.

Customer accounts that have an unclaimed status associated with their account can have an indicator or marking associated in the user interface, such as a red unclaimed badge in the "Customer Details" section of the dashboard. When the customer claims their account, the indicator can be configured to disappear. Further, the last modified status in the customer details can be updated, for example a new entry can refer to when the customer claimed their account. That is, each entry in the dashboard can show when a customer account has been claimed. An exemplary customer details section 500 of a customer account is depicted in FIG. 5.

An unclaimed customer account can be claimed utilizing a companion app configured to communicate with the carwash service system. However, an account may be claimed in the dashboard interface itself instead. In some embodiments of the carwash service system, the unclaimed customer accounts can have a "Claim Customer" account button 502 or the like in the dashboard interface, e.g., next to an 'Edit' button 504. In response to activation, the dashboard can prompt a user to enter any appropriate information for to claim the customer account, for example, a customer account email, customer home zip code, and payment information. In the current disclosure, the system prompts entry of new payment information, e.g., a new credit card, to be associated with the account. This prompt ensures that the payment information is that of the customer claiming the account. Once claimed, the carwash services system can configure the account to permit purchases to be made. Also, if the customer account has an active pre-paid unlimited subscription, the subscription status can be converted to a normal subscription status.

The process for claiming a customer account from the dashboard can generally include filling in or verifying some information associated with an unclaimed carwash service account. If the carwash service account is being claimed via the dashboard as opposed to through the companion app, the process can include the following steps:

Navigate the dashboard user interface to the desired unclaimed customer account

On the customer information interface, activate a 'Claim Customer' button

Figures 6, 7:
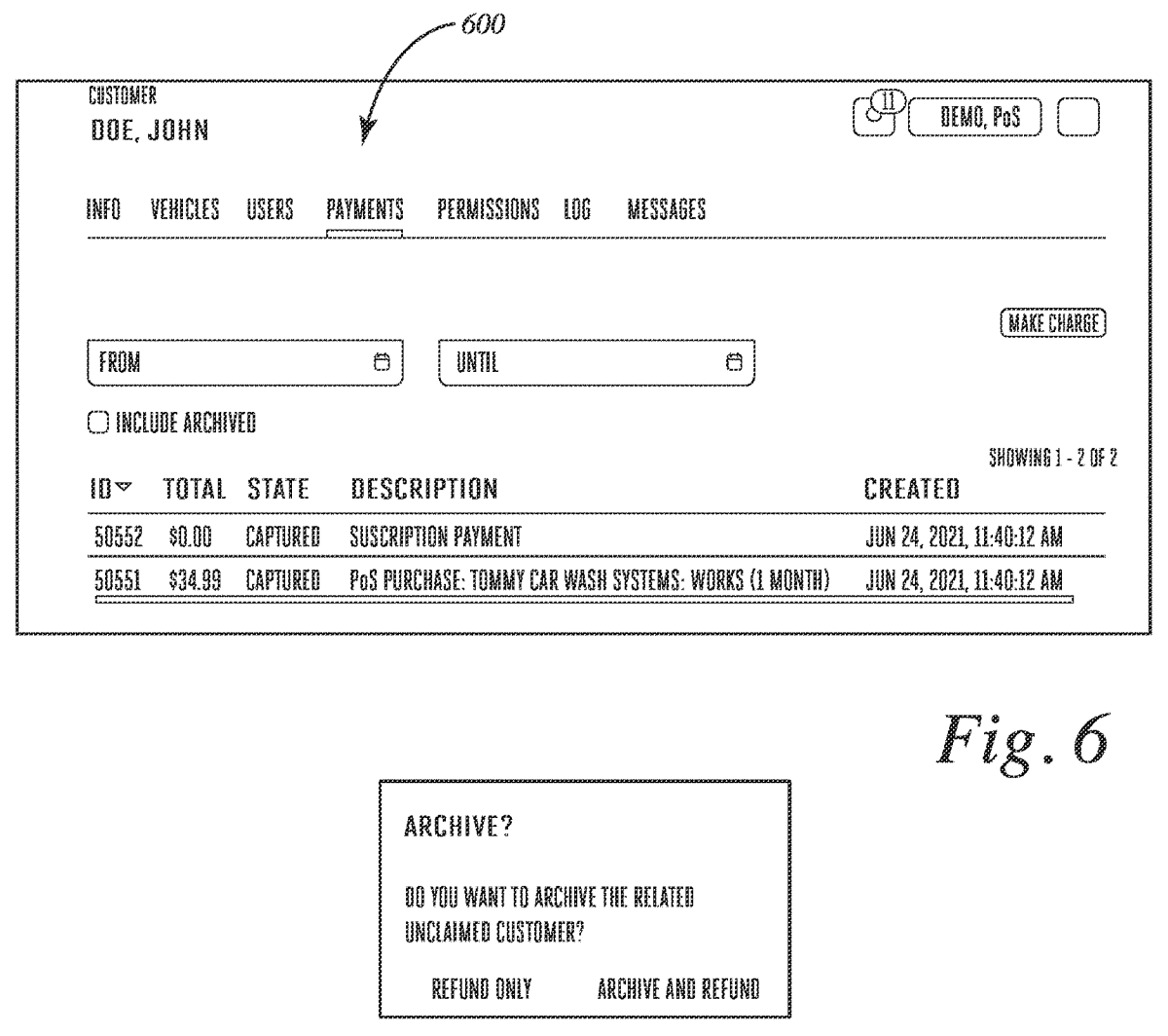

Enter or verify customer information, such as customer email address, customer home zip code Enter payment information into the payment information interface, e.g. by checking the "Add Card" checkbox and entering the appropriate payment information provided by the customer Activating a 'Claim Customer' account button For carwash service system payments, the point of sale payment associated with the initial purchase can be associated with and depicted on a customer account payment screen. For example, FIG. 6 depicts an exemplary payments tab 600 for an exemplary customer account in the dashboard interface. Each payment entry can list various information, such as a unique payment ID, a total payment amount, a status or state of the payment information (e.g., captured), a description of the payment, and a date/time stamp. The payment information can include a link to the point of sale payment that is associated with the site point of sale customer, and when clicked will bring the user to the site PoS customer account. For example, in a customer relationship management environment (e.g., dashboard) payments run through the point-of-sale system can be linked to the customer account, which provides a simple and easy way to locate the initial payment later. Then, when the payment link is clicked it will bring the user to the appropriate point-of-sale transaction.

The carwash service system can be configured to handle refunds for carwash service payments differently from standard refunds. For example, depending on the situation, when refunding, the carwash service payment can be refunded as normal. Or, alternatively, the payment can be refunded to the user and the customer account associated with that payment can be archived. An exemplary interface for this is depicted in FIG. 7. This ability to "archive and refund" can be helpful in situations where the customer may return and purchase a carwash service product in the future. That is, by archiving instead of deleting the information the system can provide a quicker experience in the future if an archived customer would like to rejoin the carwash service because the archived information can be utilized to accelerate the rejoining process.

The carwash service system can be configured to launch a short message service (SMS) drip campaign or other type of text message campaign to engage guests associated with unclaimed customer accounts. In response to creation of an unclaimed carwash service customer account, the carwash service system sends an SMS message to the cell phone number welcoming the customer to the carwash service and provides a deep link to download the companion carwash service app so the customer can complete the carwash service registration process and claim their account. The unclaimed carwash service account can also be enrolled in a SMS drip campaign that sends reminder messages to claim their account to continue washing after their first billing period. In one embodiment of the present disclosure, the guest cell phone number associated with the unclaimed carwash service account is sent reminder messages one, three, and five days after the account creation. Then, SMS reminder messages are sent again at five, three, and one day(s) left of the first billing period associated with the account. A SMS reminder message to claim the account is also sent after each time the unclaimed customer account washes at any carwash service location associated with the carwash service system.

Some exemplary messages of the SMS drip campaign for unclaimed carwash service subscription accounts follow:
Initial Message: [Welcome message.] Finalize your subscription by downloading the app from {Deep Link}
1, 3, 5, −5, −3 days: [Welcome message.] Time is running out to claim your free month and keep enjoying life in the APP lane. Click here to download the app and complete your account set-up. {Deep Link}
Last Day: Time is running out to claim your free month and keep enjoying life in the APP lane. Click here to download the app and complete your account set-up. {Deep Link}
Unique Wash: [Welcome message.] Be sure to claim your free month and keep enjoying life in the APP lane. Click here to download the app and complete your account set-up. {Deep Link}

Some exemplary messages of the SMS drip campaign for unclaimed carwash service pay-per-wash accounts follow:
Initial Message: [Welcome message.] Complete your Pay per Wash account set-up and claim your free wash by downloading the app from {Deep Link}
5, 7, 10, 14 days: [Welcome message.] Don't forget to finish setting up your account so you can claim your free wash and unlock life in the APP lane. Click here to download the app and complete your account set-up. {Deep Link}
Unique Wash: [Welcome message.] We hope that you enjoyed the convenience of Pay per Wash and keep enjoying life in the APP lane. Future washes will automatically charge your preferred payment method when you visit Tommy's Express Car Wash.

Once an unclaimed customer account is claimed, the SMS drip campaign is stopped. In addition, the SMS drip campaign is stopped in response to receiving a stop message, for example, in ene embodiment if the user texts 'Stop' to the phone number sending the SMS messages, the carwash service system is configured to stop future marketing messages.

Figure 8:
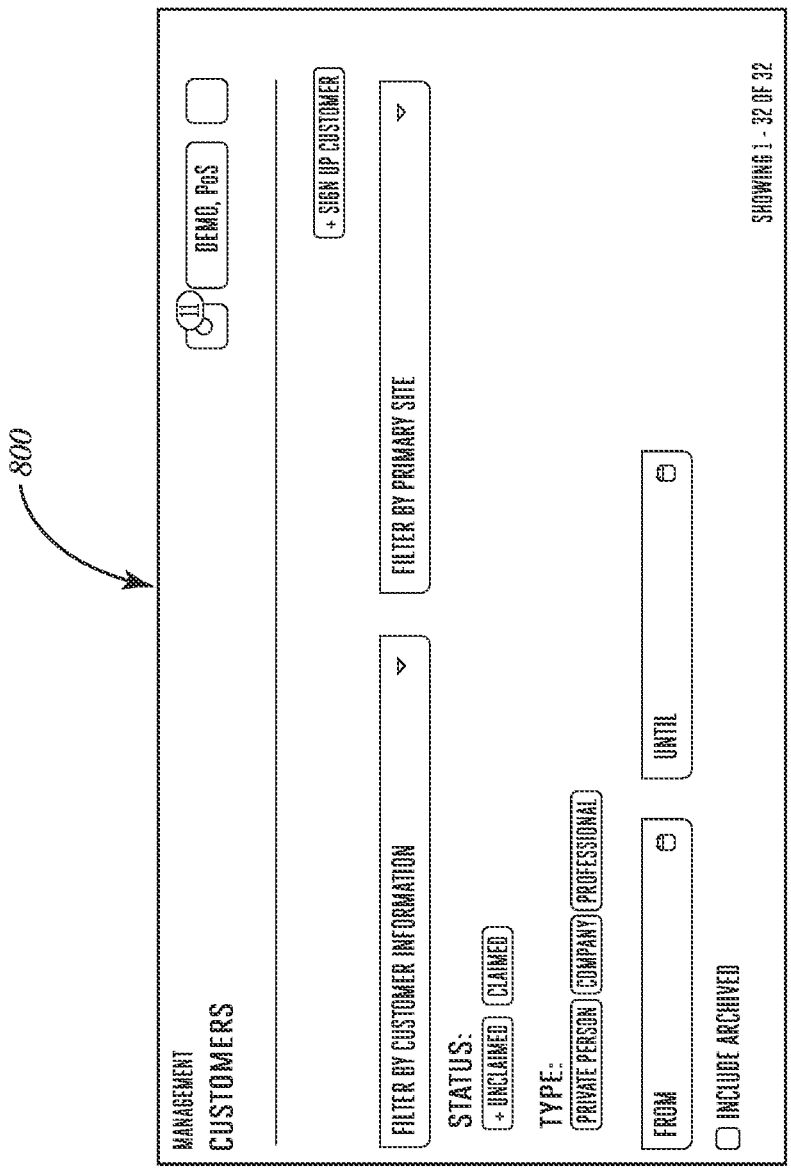
FIG. 8 illustrates an exemplary customer search interface.

A carwash service interface, for example the dashboard interface of the carwash service interface available at the point of sale device can provide an interface to search for carwash service accounts. The carwash service interface can be configured to help find unclaimed and claimed customer accounts quickly with a status filter. Customers can be filtered by various customer information and/or carwash service locations. The account status filter can be utilized to filter the customer accounts to either unclaimed or claimed customer accounts, or both. The search results can be limited to customers that registered with the carwash service process when selecting one or both of the statuses. This allows the interface to filter out search results of customers that registered organically in the app or registered in the dashboard when one or both of the unclaimed/claimed statuses are selected. Additional status and filter options may be included in alternative embodiments. An exemplary customer search interface 800 is depicted in FIG. 8.

Occasionally, incorrect customer details may be gathered at the point of sale when registering a customer account. The carwash service dashboard can allow editing of certain fields for unclaimed customer accounts. For example, in the current embodiment, the following customer account information fields can be modified via the carwash service dashboard on the point of sale device: First name, Last name, Phone Number. In addition, essentially any field associated with the customer vehicle information can also be edited to correct for any potentially misread information by the license plate recognition (LPR), Automatic Make & Model Recognition (AMMR), Automatic State Recognition (ASR) software.

Figure 9:
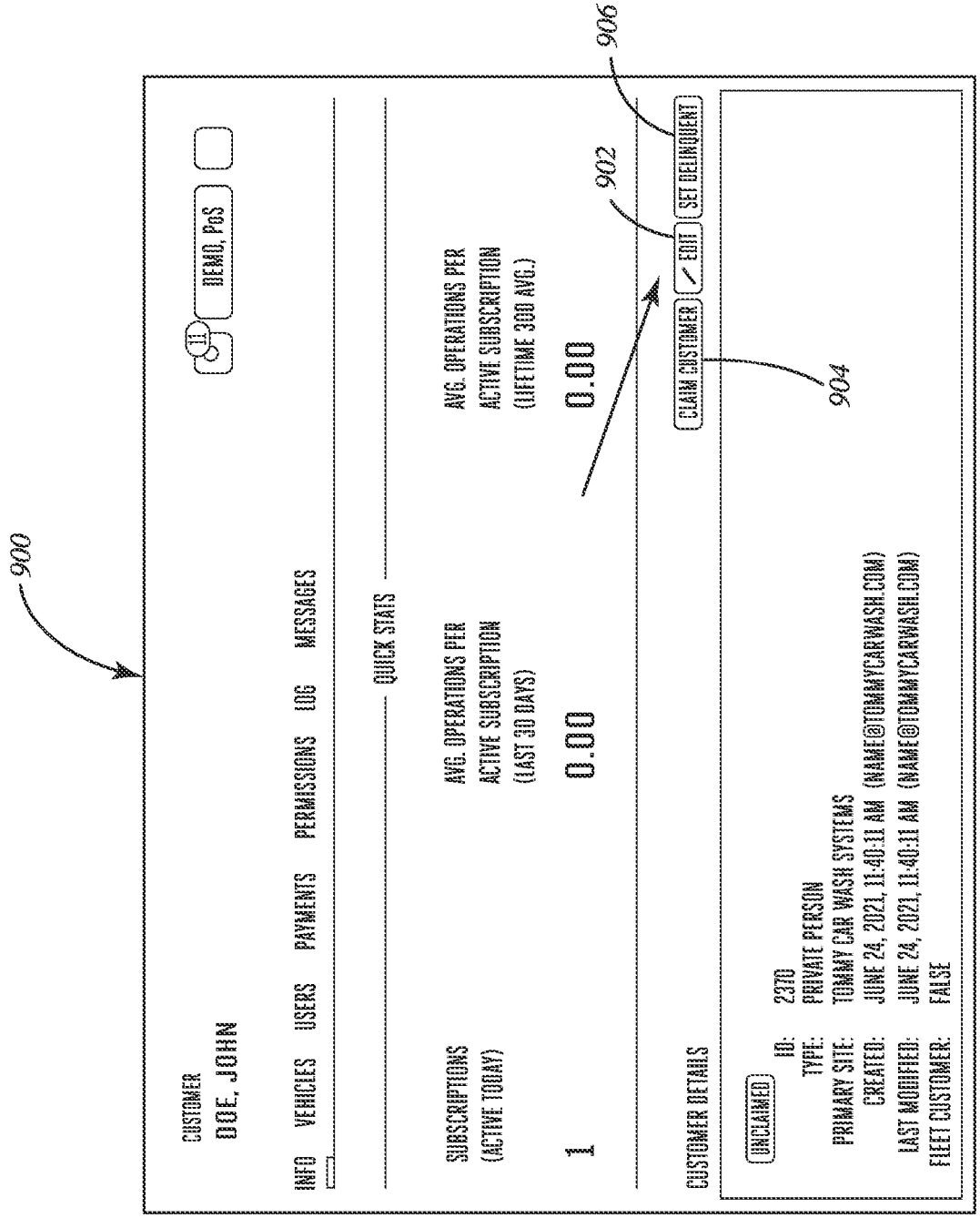
FIG. 9 illustrates an exemplary customer account interface.

To edit unclaimed customer account information after navigating to the desired carwash service customer account 900, an "Edit" button 902 can be activated to enable editing of the information. The "Edit" button can be located between the 'Claim Customer' 904 and 'Set Delinquent' 906 buttons in the interface, as depicted in the exemplary customer account interface depicted in FIG. 9. Once in edit mode, the customer detail fields can be edited and saved to the carwash service database.

Figure 10A:
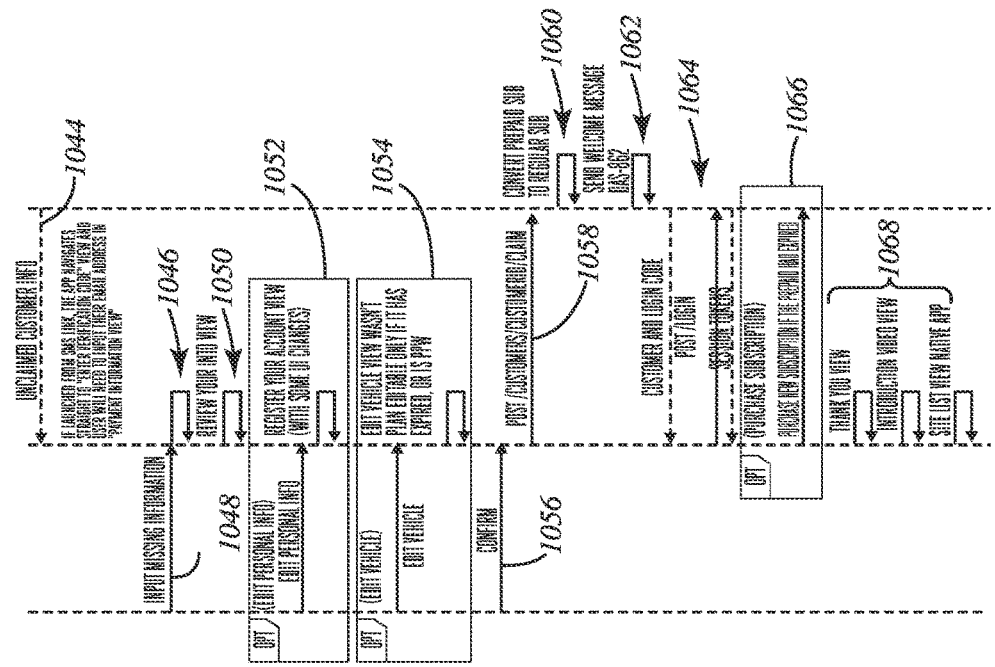
FIGS. 10A-B depict an exemplary flow diagram between the companion carwash service app and carwash backend system.
Figure 10B:
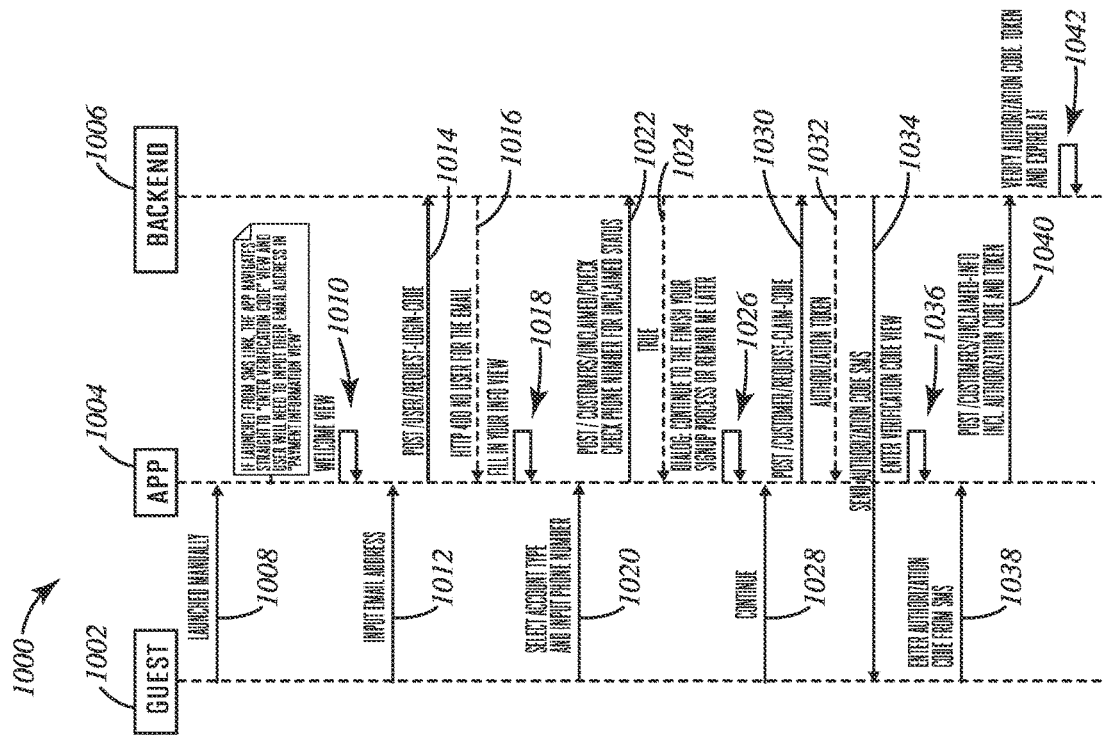

An exemplary flow diagram 1000 of one embodiment of the carwash service app is depicted in FIGS. 10A-B. The diagram depicts an exemplary flow between the guest input 1002, app 1004, and the backend carwash service system 1006.

The flow diagram 1000 begins with the guest 1002 launching 1008 the app 1004 manually on their personal device, e.g., a cell phone, tablet, or other personal device. The app 1004 may be launched from a deep link provided in an SMS sent to the guest's device by the SMS drip campaign. In this case, the deep link causes the guest device to open the app and automatically navigate to the verification code view 1036 where the user is prompted to enter a verification code. Otherwise, if the app is launched without a deep link, the app navigates the user to a welcome view 1010 with a prompt for the user to enter login information, such an email address 1012. The app 1004 is configured to communicate with the backend 1006 to request a one-time login code be sent to the guest's device for two-factor authentication 1014 (e.g., App→Backend:POST/users/request-login-code). If no account is associated with the email, then an error can be sent from the backend to the app 1016 (e.g., Backend→App:HTTP 400\nNo user for the email). Otherwise, the app presents the user with information view 1018 that has fields to fill in select information. For example, the guest/user can input information into the app to indicate the account type and phone number to be associated with the account 1020. Select information can be passed along to the carwash service backend to determine whether or not the associated account is unclaimed 1022 (e.g., App→Backend: POST/customers/unclaimed/check Check phone number for unclaimed status). In response to the backend indicating the account is unclaimed 1024, the app can display a dialog box allowing the customer to continue finishing the signup process or be reminded later 1026 (e.g., App→App:Dialog: Continue to finish your signup process OR Remind me later).

If the guest elects to continue the carwash service account claiming process 1028, the app requests that a authentication code be sent to the user and an authentication token be provided to the app 1030 (e.g., App→Backend:POST/customers/request-claim-code). In response, the backend communicates the authorization token to the app 1032 over a network (Backend→App:Authorization token) and communicates an authorization code, e.g., via SMS to the user's phone number 1034 (Backend→Guest:Send authorization code SMS).

After the guest elects to continue 1028, the app interface transitions to a verification view 1036 (e.g., App→App: Enter verification code view) and awaits entry of the authorization code by the user from the SMS 1038 (e.g., Guest→App:Enter authorization code from SMS). In response to receiving the authorization code, the app relays the code and token to the backend 1040 (e.g., App→Backend:POST/customers/unclaimed-info \incl. authorization code and token), which verifies the authorization code and token 1042 (e.g., Backend→Backend:Verify authorization code and token).

After authentication is complete, the backend communicates the unclaimed customer account information 1044 to the app (e.g., Backend→App:Unclaimed customer info). The app transitions to a payment information view 1046 displaying some of the provided information in the app interface (e.g., App→App:Payment information view). If valid payment information has already been set, then the zip code may be provided without other payment information. If there is any payment information missing, the app can prompt entry of the missing information using the device interface for the app 1048 (e.g., Guest→App:Input missing information). The App can provide an opportunity for the user to review the information 1050 (e.g., App→App: Review your info view). Optionally, the app can also allow editing of personal information 1052 and vehicle information 1054. The user can confirm the information and any changes are complete 1056, which prompts the app to communicate the account information to the backend 1058 where the carwash prepaid subscription can be converted to a regular subscription 1060 and a welcome message can be sent 1062. The backend can proceed with a login sequence 1064 (e.g., Backend→App:Customer and login code, App-→Backend:POST/login, Backend→App:Session tokens).

After the login process is complete for the now claimed carwash service account, the app can provide a different selection of options. For example, the app can display a selectable option to purchase a new carwash subscription service if the prepaid subscription has expired. Several other views may be presented in the app as well including a thank you view, introduction video view, and a site list view 1068.

Figures 11A, 11B:
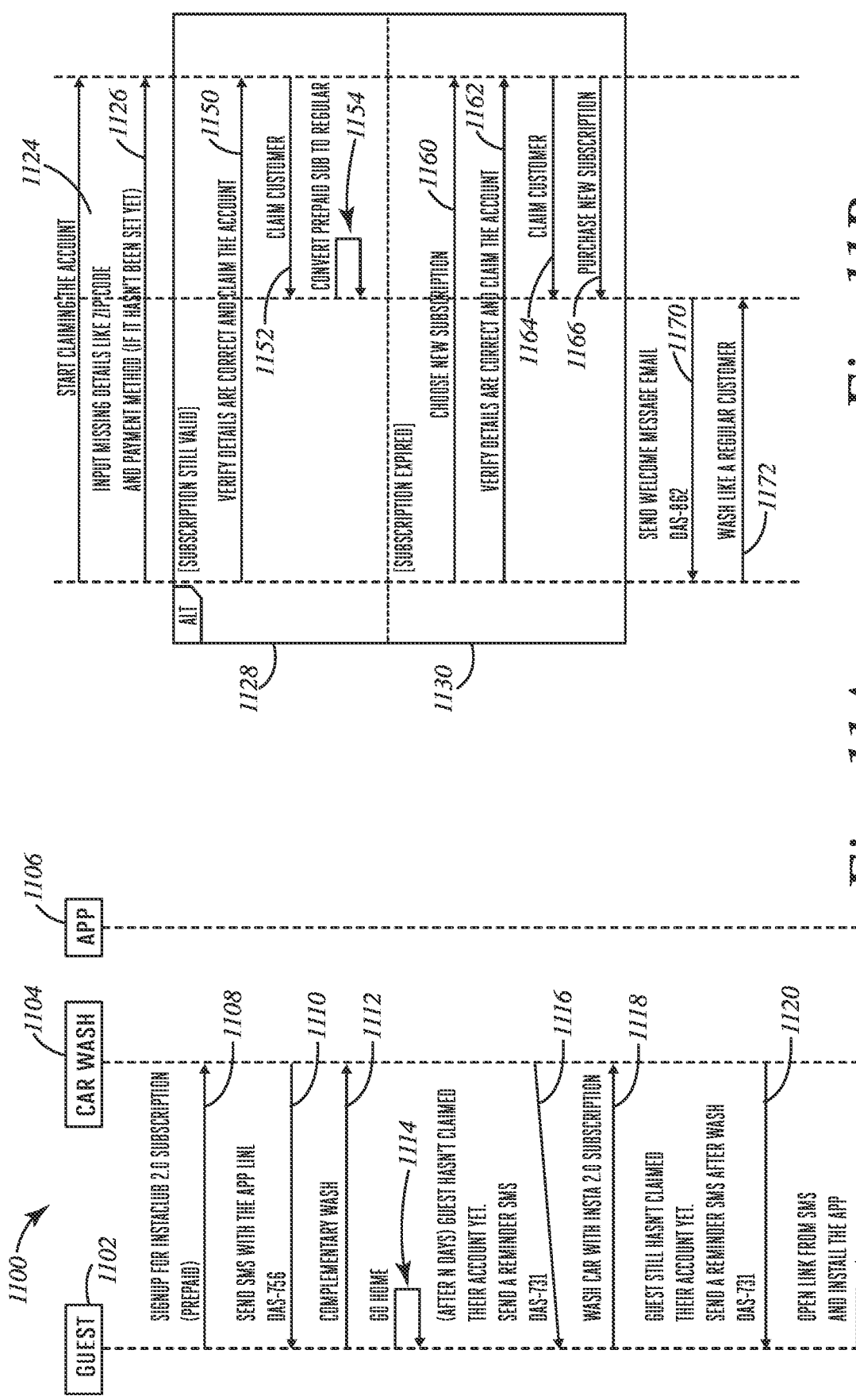
FIGS. 11A-B depicts an exemplary flow diagram between the gest, carwash system, and companion carwash service app.

An exemplary flow diagram 1100 of one embodiment of the carwash service guest flow is depicted in FIGS. 11A-B. The diagram depicts an exemplary flow between the guest input 1102, the carwash service system 1104, and the app 1106.

Flow diagram 1100 begins with a guest registering a new prepaid carwash subscription service account 1108 (Guest-→Car wash:Signup for InstaClub 2.0 subscription\n(prepaid)). In response, the carwash system sends an SMS message with the app link to the guest cell phone associated with the new prepaid carwash subscription service account 1110. The vehicle associated with the account is provided a complimentary wash at that location (Guest→Car wash: Complementary wash). That is, the carwash system permits access to the account associated with the new prepaid carwash subscription service account 1112. After the wash, the customer leaves the carwash premises 1114 (Guest-→Guest:Go home).

After an amount of time has passed, such as a predetermined number of days, the carwash system 1104 is configured to initiate the sending of a reminder text via SMS to the guest indicating that they have not yet claimed their account 1116 (Car wash→(1)Guest:(After N days) Guest hasn't claimed their account yet. Send a reminder SMSDAS-731).

The guest can continue to frequent the carwash locations associated with the subscription even while the guest has not claimed their account 1118 (Guest→Car wash:Wash car with Insta 2.0 subscription). After a wash, if the guest still hasn't claimed their account, another reminder can be sent 1120 (Car wash→Guest: Guest still hasn't claimed their account yet. Send a reminder SMS after wash DAS-731).

In response to the guest activating the link from the SMS, the guest will be guided through app installation. For example, the deep link will bring the guest to the appropriate app store for that device and, to the extent possible, automatically provide customer account information for the claiming process 1122 (Guest→Guest:Open link from SMS\and install the app).

Upon logging into the app, the guest begins the app claiming process 1124 (Guest→App:Start claiming the account). The guest can input missing details 1126 such as zip code and payment information if it has not yet been associated with the account.

If the subscription is valid 1128, details can be verified and/or corrected in the account information and the account can be claimed 1150. The app can communication an indication to the carwash service system 1104 that customer account has been claimed 1152. The carwash service system 1104 can convert the prepaid subscription to a regular subscription account in memory associated with the carwash subscription service account 1154.

If the subscription has expired, then the guest can be prompted on the app to choose a new subscription 1160, verify the details of the account are correct and verify they would like to claim the account 1162. The app can communication an indication to the carwash service system 1104 that customer account has been claimed 1164. The carwash service system 1104 can convert the prepaid subscription to a regular subscription account in memory associated with the carwash subscription service account 1166.

Once claimed, a welcome message email can be sent from the carwash service system 1170 and the claimed customer account can be permitted to wash as a regular account type customer 1172.

An exemplary flow diagram 1200 of one embodiment of the carwash service signup flow is depicted in FIG. 12. The diagram depicts an exemplary flow between the guest 1202, the carwash service point of sale device 1204, and the carwash service backend system 1206.

The signup flow diagram begins with a guest purchasing a carwash service subscription at a point of sale location 1208. For example, a point of sale service agent can operate a carwash point of sale device to enter information provided by the guest.

The point of sale device 1204 communicates with the backend 1206 creating a batch purchase for the items 1210, including the carwash service product and complementary wash, if being provided with the purchase. The point of sale can also communicate information for creation of an unclaimed customer account 1212, as discussed above.

After processing and creating the unclaimed customer account, the backend 1206 can send an unclaimed customer signup SMS with the deep link to install the app to the guest phone number 1214.

The point of sale device can also communication vehicle and purchase configuration information that includes a selected plan and coupon code, if applicable, to the backend 1206 to be associated with the unclaimed customer account 1216.

Once the unclaimed account is setup, the point of sale communicates with the backend an indication to begin the complementary wash and to permit the guest vehicle through the gate to the carwash equipment 1218.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation (s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method of controlling access of a vehicle to carwash equipment at a carwash service location, the method comprising:

providing a carwash service location including a lane controller configured to control access to a plurality of carwash lanes by selective movement of an associated carwash gate, wherein at least one of the plurality of carwash lanes is a registration carwash lane for registering a new carwash service account and at least one of the plurality of carwash lanes is an app carwash lane that automatically controls access to carwash equipment via automated selective movement of the carwash gate between an open position and a closed position, capturing, with a camera, an image of a vehicle license plate of a vehicle in one of the plurality of carwash lanes;

processing, with a carwash service location computer processor configured to process license plate images, the image of the vehicle license plate with license plate recognition software to determine a set of vehicle characteristics associated with the vehicle license plate including a license plate number associated with the vehicle license plate, a state of origin associated with the vehicle license plate, and a make and model associated with the vehicle license plate;

comparing, with a carwash service location computer processor configured to compare vehicle characteristics, the set of vehicle characteristics associated with the vehicle license plate to vehicle characteristics of carwash subscription service profiles registered in a carwash subscription service database to determine whether the vehicle is registered for the carwash subscription service;

detecting a vehicle coming within view of a camera in the registration lane and in response to the lane controller confirming a lack of association with a carwash subscription service profile in the carwash subscription service database:

generating, with a carwash service location computer processor, a new carwash subscription service profile in memory;

associating, with a carwash service location computer processor, the set of vehicle characteristics with the new carwash subscription service profile in memory;

receiving user input indicative of customer identification for the new carwash subscription service profile at a user interface of a point-of-sale computer;

receiving user input indicative of a selection of a carwash subscription service configuration for the new carwash subscription service profile at the user interface of the point-of-sale computer;

receiving user input indicative of initial carwash service payment information at the user interface of the point-of-sale computer;

associating, with a carwash service location computer processor, the initial carwash service payment information with the new carwash subscription service profile; and setting, with a carwash service location computer processor, the new carwash service subscriber profile to an unclaimed status;

transmitting a message to a customer mobile device based on the customer identification, the message including a deep link to download a carwash subscription service app;

detecting a vehicle coming within view of a camera in the app lane and in response to the lane controller confirming association with a carwash subscription service profile in the carwash subscription service database and the associated carwash subscription service profile having the unclaimed status:

permitting, by the lane controller automatically moving the carwash gate of the app carwash lane to the open position, vehicle access to the carwash equipment during an initial time period based upon the associated carwash subscription service configuration and the initial carwash service payment information;

restricting, by the lane controller maintaining the carwash gate of the app carwash lane in the closed position, vehicle access to carwash equipment after the initial time period;

preventing submission of an automatic renewal payment for the carwash subscription service of the associated carwash subscription service profile based upon the initial carwash service payment information in the associated carwash subscription service profile; and transmitting a reminder message to the customer mobile device based on the customer identification, the reminder message reminding the customer the associated carwash subscription service profile has an unclaimed status;

detecting a vehicle coming within view of a camera in the app lane and in response to the lane controller confirming association with a carwash subscription service profile in the carwash subscription service database and the associated carwash subscription service profile having the claimed status, permitting, by automatically moving the carwash gate of the app carwash lane to the open position, vehicle access to the carwash equipment based upon the associated carwash subscription service configuration.

2. The method of claim 1 wherein the carwash service location computer processor configured to process license plate images is located on a point-of-sale computer at the carwash service location.

3. The method of claim 1 wherein the carwash service location computer processor configured to process license plate images is located on a cloud server and the method includes communicating the image of the vehicle license plate to the cloud server.

4. The method of claim 1 wherein the carwash service location computer processor configured to compare vehicle characteristics is located on a cloud server and the method includes communicating the set of vehicle characteristics with the cloud server and receiving an indication the vehicle is not registered in the carwash service subscriber database from the cloud server.

5. The method of claim 1 including displaying on the user interface of the point-of-sale computer at the carwash service location the new carwash service subscriber profile including the set of vehicle characteristics associated with the new carwash service subscriber profile.

6. The method of claim 1 wherein the customer identification includes one or more of customer name, customer cellphone, and vehicle color.

7. The method of claim 1 wherein the initial carwash service payment information includes credit card information.

8. The method of claim 1 wherein in response to the vehicle already being associated with a different carwash subscription service profile in the carwash subscription service database outputting an error message.

9. The method of claim 1 wherein in response to a phone number already being associated with a different carwash subscription service profile in the carwash subscription service database outputting an error message.

10. The method of claim 1 wherein the carwash subscription service app includes a request to verify personal information, vehicle information, payment information, and legal terms.

11. The method of claim 1 wherein in response to receiving, at a cloud server, an initial login request matching the associated carwash subscription service profile, transmitting a one-time access code to the customer mobile device based upon the customer identification information of the associated carwash subscription service profile.

12. The method of claim 11 wherein in response to receiving the one-time access code, at the cloud server, requesting verification of information from the associated carwash subscription service profile and in response to receiving, at the cloud server, an indication of verification of information from the associated carwash subscription service profile, setting the new carwash service subscriber profile to claimed status.

13. A system for controlling access of a vehicle to carwash equipment at a carwash service location, the system comprising:

a plurality of carwash lanes, wherein at least one of the plurality of carwash lanes is a registration carwash lane for registering a new carwash service account and at least one of the plurality of carwash lanes is an app carwash lane having a carwash gate;

a lane controller configured to control access to carwash equipment by selective movement of the carwash gate between an open position and a closed position;

a camera configured to capture an image of a vehicle license plate of a vehicle in one of the plurality of carwash lanes;

a point-of-sale computer having a user interface;

a carwash service location computer processor configured to:
  process the image of the vehicle license plate with license plate recognition software to determine a set of vehicle characteristics associated with the vehicle license plate including a license plate number, a state of origin, and a make and model;
  compare the set of vehicle characteristics associated with the vehicle license plate to vehicle characteristics of carwash subscription service profiles registered in a carwash subscription service database to determine whether the vehicle is registered for the carwash subscription service;
  detect a vehicle coming within view of a camera in the registration lane;
  confirm a lack of association with a carwash subscription service profile in the carwash subscription service database, and in response:
    generate a new carwash subscription service profile in memory;
    associate the set of vehicle characteristics with the new carwash subscription service profile in memory;
    receive user input indicative of customer identification for the new carwash subscription service profile from the user interface of the point-of-sale computer;
    receive user input indicative of a selection of a carwash subscription service configuration for the new carwash subscription service profile from the user interface of the point-of-sale computer;
    receive user input indicative of initial carwash service payment information at the user interface of the point-of-sale computer;
    associate the initial carwash service payment information with the new carwash subscription service profile; and
    set the new carwash service subscriber profile to an unclaimed status; and
    transmit a message to a customer mobile device based on the customer identification, the message including a deep link to download a carwash subscription service app;
confirm association with a carwash subscription service profile in the carwash subscription service database and the associated carwash subscription service profile having the unclaimed status, and in response:
permit vehicle access to the carwash equipment by instructions to the lane controller to open the carwash gate during an initial time period based upon the associated carwash subscription service configuration and the initial carwash service payment information;
restrict vehicle access to carwash equipment by lack of instructions to the lane controller to open the gate after the initial time period;
prevent submission of an automatic renewal payment for the carwash subscription service of the associated carwash subscription service profile based upon the initial carwash service payment information in the associated carwash subscription service profile; and
transmit a reminder message to the customer mobile device based on the customer identification, whereby the reminder message reminds the customer that the associated carwash subscription service profile has an unclaimed status;
confirm association with a carwash subscription service profile in the carwash subscription service database and the associated carwash subscription service profile having the claimed status, and in response permit vehicle access to the carwash equipment by instructions to the lane controller to open the carwash gate, based upon the associated carwash subscription service configuration.

14. The system of claim 13 wherein the carwash service location computer processor configured to process license plate images is located on the point-of-sale computer at the carwash service location.

15. The system of claim 13 wherein the carwash service location computer processor configured to process license plate images is located on a cloud server and the system includes a communication interface for communicating the image of the vehicle license plate to the cloud server.

16. The system of claim 13 wherein the carwash service location computer processor configured to compare vehicle characteristics is located on a cloud server and the system includes a communication interface configured to communicate the set of vehicle characteristics to the cloud server and receive an indication about whether the vehicle is registered in the carwash service subscriber database from the cloud server.

17. The system of claim 13 including displaying on the user interface of the point-of-sale computer at the carwash service location the new carwash service subscriber profile including the set of vehicle characteristics associated with the new carwash service subscriber profile.

18. The system of claim 13 wherein the customer identification includes one or more of customer name, customer cellphone, and vehicle color.

19. The system of claim 13 wherein the initial carwash service payment information includes credit card information.

20. The system of claim 13 wherein the carwash service location computer processor is configured to output an error message in response to a vehicle already being associated with a different carwash subscription service profile in the carwash subscription service database.

21. The system of claim 13 wherein the carwash service location computer processor is configured to output an error message in response to a phone number already being associated with a different carwash subscription service profile in the carwash subscription service database.

22. The system of claim 13 wherein the carwash subscription service app includes a request to verify personal information, vehicle information, payment information, and legal terms.

23. The system of claim 13 wherein a cloud server is configured to transmit a one-time access code to the customer mobile device based upon the customer identification information of the associated carwash subscription service profile in response to receipt of, at the cloud server, an initial login request matching the associated carwash subscription service profile.

24. The system of claim 23 wherein in response to receipt of the one-time access code, at the cloud server, the cloud server requests verification of information from the associated carwash subscription service profile and in response to receipt, at the cloud server, of an indication of verification of information from the associated carwash subscription service profile, the cloud server sets the new carwash service subscriber profile to claimed status.

* * * * *